(12) United States Patent
Boyles

(10) Patent No.: US 8,788,685 B1
(45) Date of Patent: Jul. 22, 2014

(54) SYSTEM AND METHOD FOR TESTING MULTI-PROTOCOL STORAGE SYSTEMS

(75) Inventor: John R. Boyles, Cranberry, PA (US)

(73) Assignee: NetApp, Inc., Sunnyvale, CA (US)

( * ) Notice: Subject to any disclaimer, the term of this patent is extended or adjusted under 35 U.S.C. 154(b) by 969 days.

(21) Appl. No.: 11/413,023

(22) Filed: Apr. 27, 2006

(51) Int. Cl.
*G06F 15/16* (2006.01)
*G06F 11/00* (2006.01)

(52) U.S. Cl.
USPC .................. 709/229; 709/217; 714/42

(58) Field of Classification Search
USPC ..................... 709/228, 229; 714/42
See application file for complete search history.

(56) References Cited

U.S. PATENT DOCUMENTS

| | | | | |
|---|---|---|---|---|
| 5,535,375 A * | 7/1996 | Eshel et al. | | 703/27 |
| 5,819,292 A | 10/1998 | Hitz | | |
| 5,826,017 A * | 10/1998 | Holzmann | | 709/230 |
| 5,951,697 A * | 9/1999 | O'Donnell et al. | | 714/37 |
| 5,954,829 A * | 9/1999 | McLain, Jr. et al. | | 714/712 |
| 6,373,822 B1 * | 4/2002 | Raj et al. | | 370/252 |
| 6,859,758 B1 * | 2/2005 | Prabhakaran et al. | | 702/186 |
| 7,409,494 B2 * | 8/2008 | Edwards et al. | | 711/114 |
| 2002/0019874 A1 * | 2/2002 | Borr | | 709/229 |
| 2002/0116507 A1 * | 8/2002 | Manjure et al. | | 709/229 |
| 2002/0116593 A1 | 8/2002 | Kazar et al. | | |
| 2004/0015722 A1 * | 1/2004 | Klotz et al. | | 713/201 |
| 2004/0073656 A1 * | 4/2004 | Booth et al. | | 709/224 |
| 2004/0139167 A1 * | 7/2004 | Edsall et al. | | 709/212 |
| 2004/0261078 A1 * | 12/2004 | Abou-Emara et al. | | 718/107 |
| 2005/0129183 A1 * | 6/2005 | Booth | | 379/1.01 |
| 2007/0022314 A1 * | 1/2007 | Erasani et al. | | 714/4 |

* cited by examiner

*Primary Examiner* — Rupal Dharia
*Assistant Examiner* — Joe Chacko
(74) *Attorney, Agent, or Firm* — Cesari and McKenna, LLP

(57) ABSTRACT

A system and method for testing multi-protocol network access using a synthetic multi-protocol client is provided. The synthetic multi-protocol client implements one or more predefined and/or user defined tests that interleave data access operations directed to a storage system using a plurality of data access protocols.

24 Claims, 11 Drawing Sheets

SYSTEM AND METHOD FOR TESTING MULTI-PROTOCOL STORAGE SYSTEMS

FIELD OF THE INVENTION

The present invention relates to testing storage systems and, more particularly, to generating a synthetic multi-protocol client for the testing of storage systems.

BACKGROUND OF THE INVENTION

A storage system typically comprises one or more storage devices into which information may be entered, and from which information may be obtained, as desired. The storage system includes a storage operating system that functionally organizes the system by, inter alia, invoking storage operations in support of a storage service implemented by the system. The storage system may be implemented in accordance with a variety of storage architectures including, but not limited to, a network-attached storage environment, a storage area network and a disk assembly directly attached to a client or host computer. The storage devices are typically disk drives organized as a disk array, wherein the term "disk" commonly describes a self-contained rotating magnetic media storage device. The term disk in this context is synonymous with hard disk drive (HDD) or direct access storage device (DASD).

The storage operating system of the storage system may implement a high-level module, such as a file system, to logically organize the information stored on volumes as a hierarchical structure of data containers, such as files and logical units. For example, each "on-disk" file may be implemented as set of data structures, i.e., disk blocks, configured to store information, such as the actual data for the file. These data blocks are organized within a volume block number (vbn) space that is maintained by the file system. The file system may also assign each data block in the file a corresponding "file offset" or file block number (fbn). The file system typically assigns sequences of fbns on a per-file basis, whereas vbns are assigned over a larger volume address space. The file system organizes the data blocks within the vbn space as a "logical volume"; each logical volume may be, although is not necessarily, associated with its own file system.

A known type of file system is a write-anywhere file system that does not overwrite data on disks. If a data block is retrieved (read) from disk into a memory of the storage system and "dirtied" (i.e., updated or modified) with new data, the data block is thereafter stored (written) to a new location on disk to optimize write performance. A write-anywhere file system may initially assume an optimal layout such that the data is substantially contiguously arranged on disks. The optimal disk layout results in efficient access operations, particularly for sequential read operations, directed to the disks. An example of a write-anywhere file system that is configured to operate on a storage system is the Write Anywhere File Layout (WAFL®) file system available from Network Appliance, Inc., Sunnyvale, Calif.

The storage system may be further configured to operate according to a client/server model of information delivery to thereby allow many clients to access data containers stored on the system. In this model, the client may comprise an application, such as a database application, executing on a computer that "connects" to the storage system over a computer network, such as a point-to-point link, shared local area network (LAN), wide area network (WAN), or virtual private network (VPN) implemented over a public network such as the Internet. Each client may request the services of the storage system by issuing file-based and block-based protocol messages (in the form of packets) to the system over the network.

Many conventional storage systems support both the Network File System (NFS) protocol and the Common Internet File System (CIFS) protocol so as to enable, for example, both conventional Microsoft Windows-based and UNIX-based clients to access data stored on the storage system. It is generally easy to obtain an NFS client and/or a CIFS client for purposes of testing a new implementation of a storage system; however, there are no presently known multi-protocol NFS and CIFS clients that are capable of interleaving commands of the two protocols directed to a single multi-protocol storage system for testing and/or debugging operations. Thus a noted problem arises for storage system developers when testing storage systems that implement multi-protocol capabilities. Such a need may arise to ensure that certain operations succeed and/or fail accordingly based on commands executed by the other protocol. For example, a range lock may be placed on a file served by a storage system using the CIFS protocol, and then a client may attempt to access the locked region of the file using the NFS protocol. Presently, a storage system vendor may acquire separate NFS and CIFS clients when implementing such a test on the storage system. However, such a multi-client testing implementation requires additional programming in order to ensure that the plurality of clients operate in a synchronous manner to ensure that operations arrive at the storage system in the desired order. This also results in increased cost by requiring the storage system vendor to obtain a plurality of storage system clients for testing purposes.

SUMMARY OF THE INVENTION

The present invention overcomes the disadvantages of the prior art by providing a system and method for generating a synthetic multi-protocol network client for testing one or more storage systems. The synthetic multi-protocol client illustratively supports the Transport Control Protocol (TCP) and/or User Datagram Protocol (UDP) along with a plurality of higher-level network access protocols, such as e.g., the NFS protocol (and its associated protocols, e.g., NLM, portmap, and mount) and the CIFS protocol. When used as a testing tool, a user first initiates the synthetic multi-protocol client with appropriate connection information to permit the client to connect simultaneously to the storage system using one or more of the supported protocols. The connection information illustratively includes (a) the network address(es) of the storage system, (b) the types of protocols to be utilized in the connection, (c) NFS specific parameters (e.g., username, NIS server, mount path, etc.), (d) CIFS specific parameters (e.g., CIFS domain name, username, share name, etc.) and (e) optional base paths relative to the root of the NFS mount/CIFS share name root if the default test location is to differ from the root.

Once connected, the user may select one or more tests to execute to ensure proper multi-protocol implementation within the storage system. Each test may be predefined and/or customizable by the user, and may further interleave one or more data access operations using each of the plurality of protocols to test proper interactions within the storage system and/or storage operating system executing on the storage system. The synthetic multi-protocol client examines the received responses from the server and compares them with a set of expected results. Any deviation from the expected results is immediately reported to the user of the client as a server error with additional error context information as needed.

BRIEF DESCRIPTION OF THE DRAWINGS

The above and further advantages of invention may be better understood by referring to the following description in conjunction with the accompanying drawings in which like reference numerals indicate identical or functionally similar elements.

DETAILED DESCRIPTION OF AN ILLUSTRATIVE EMBODIMENT

A. Cluster Environment

Figure 1:
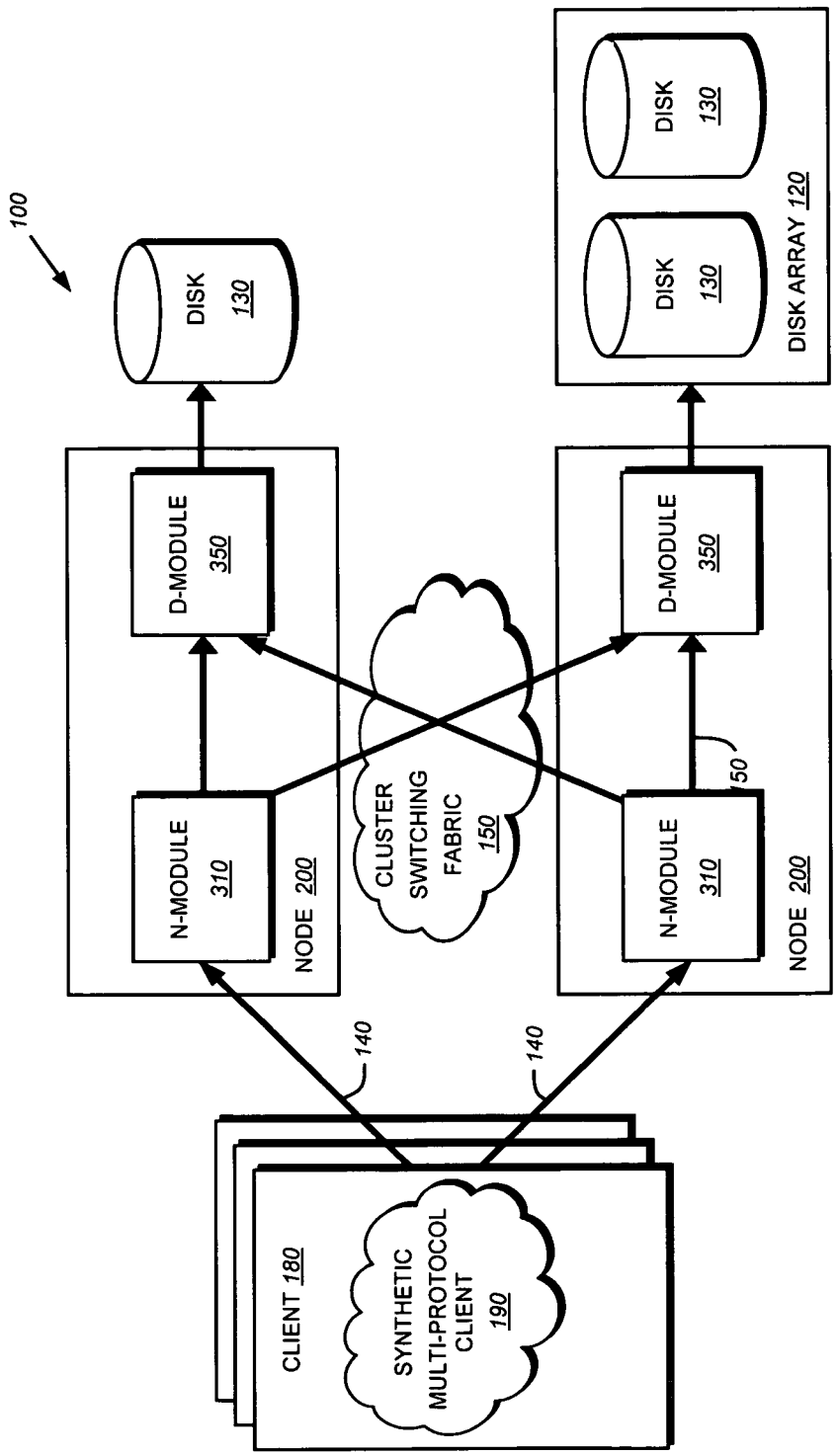
FIG. 1 is a schematic block diagram of a plurality of nodes interconnected as a cluster in accordance with an embodiment of the present invention.

FIG. 1 is a schematic block diagram of a plurality of nodes 200 interconnected as a cluster 100 and configured to provide storage service relating to the organization of information on storage devices. The nodes 200 comprise various functional components that cooperate to provide a distributed storage system architecture of the cluster 100. To that end, each node 200 is generally organized as a network element (N-module 310) and a disk element (D-module 350). The N-module 310 includes functionality that enables the node 200 to connect to clients 180 over a computer network 140, while each D-module 350 connects to one or more storage devices, such as disks 130 of a disk array 120. The nodes 200 are interconnected by a cluster switching fabric 150 which, in the illustrative embodiment, may be embodied as a Gigabit Ethernet switch. An exemplary distributed file system architecture is generally described in U.S. Patent Application Publication No. US 2002/0116593 titled METHOD AND SYSTEM FOR RESPONDING TO FILE SYSTEM REQUESTS, by M. Kazar et al. published Aug. 22, 2002. It should be noted that while there is shown an equal number of N and D-modules in the illustrative cluster 100, there may be differing numbers of N and/or D-modules in accordance with various embodiments of the present invention. For example, there may be a plurality of N-modules and/or D-modules interconnected in a cluster configuration 100 that does not reflect a one-to-one correspondence between the N and D-modules. As such, the description of a node 200 comprising one N-module and one D-module should be taken as illustrative only.

The clients 180 may be general-purpose computers configured to interact with the node 200 in accordance with a client/server model of information delivery. That is, each client may request the services of the node, and the node may return the results of the services requested by the client, by exchanging packets over the network 140. The client may issue packets including file-based access protocols, such as the Common Internet File System (CIFS) protocol or Network File System (NFS) protocol, over the Transmission Control Protocol/Internet Protocol (TCP/IP) when accessing information in the form of files and directories. Alternatively, the client may issue packets including block-based access protocols, such as the Small Computer Systems Interface (SCSI) protocol encapsulated over TCP (iSCSI) and SCSI encapsulated over Fibre Channel (FCP), when accessing information in the form of blocks.

Executing on the client 180 is a synthetic multi-protocol client program 190 in accordance with an embodiment of the present invention. In a typical test environment, the network 140 comprises a test network that includes capabilities for generating protocol traces between the synthetic multi-protocol client program (hereafter "synthetic multi-protocol client") 190 and the various storage system nodes 200. In accordance with the present invention, the synthetic multi-protocol client 190 simulates a plurality of physical clients utilizing a plurality of differing protocols that send interleaved data access operations to the storage system for testing purposes. In an exemplary embodiment, the synthetic multi-protocol client 190 is a stand alone test program executed on a client computer 180; however, in alternate embodiments, the synthetic multi-protocol client 190 may comprise a portion of a test suite of programs. As such, the description of the synthetic multi-protocol client 190 being a stand alone program should be taken as exemplary only.

B. Storage System Node

Figure 2:
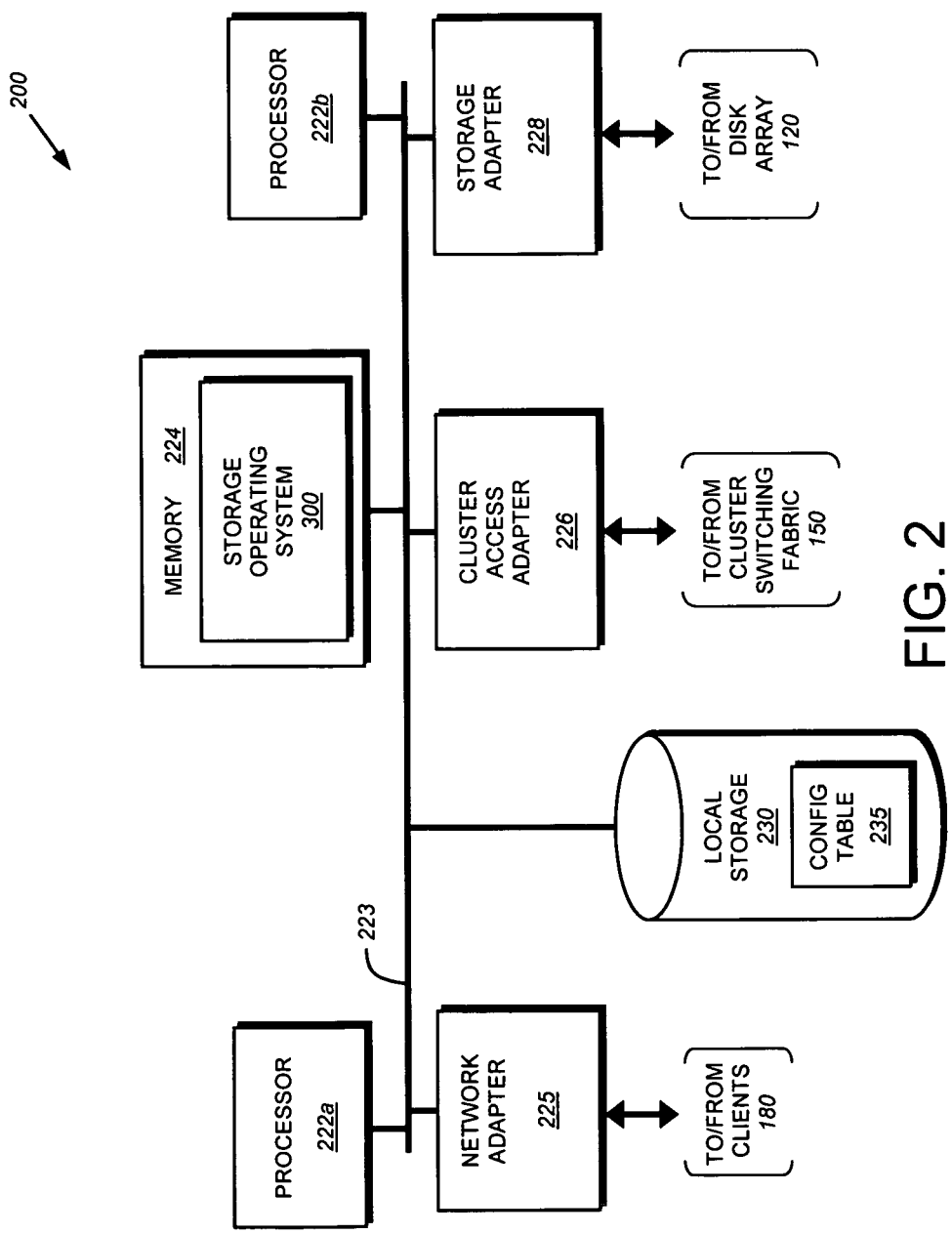
FIG. 2 is a schematic block diagram of a node in accordance with an embodiment of the present invention.

FIG. 2 is a schematic block diagram of a node 200 that is illustratively embodied as a storage system comprising a plurality of processors 222a,b, a memory 224, a network adapter 225, a cluster access adapter 226, a storage adapter 228 and local storage 230 interconnected by a system bus 223. The local storage 230 comprises one or more storage devices, such as disks, utilized by the node to locally store configuration information (e.g., in configuration table 235) provided by one or more management processes that execute as user mode applications 1100 (see FIG. 11). The cluster access adapter 226 comprises a plurality of ports adapted to couple the node 200 to other nodes of the cluster 100. In the illustrative embodiment, Ethernet is used as the clustering protocol and interconnect media, although it will be apparent to those skilled in the art that other types of protocols and interconnects may be utilized within the cluster architecture described herein. In alternate embodiments where the N-modules and D-modules are implemented on separate storage systems or computers, the cluster access adapter 226 is utilized by the N/D-module for communicating with other N/D-modules in the cluster 100.

Each node 200 is illustratively embodied as a dual processor storage system executing a storage operating system 300 that preferably implements a high-level module, such as a file system, to logically organize the information as a hierarchical structure of named directories, files and special types of files called virtual disks (hereinafter generally "blocks") on the disks. However, it will be apparent to those of ordinary skill in the art that the node 200 may alternatively comprise a single or more than two processor system. Illustratively, one processor 222*a* executes the functions of the N-module 310 on the node, while the other processor 222*b* executes the functions of the D-module 350.

The memory 224 illustratively comprises storage locations that are addressable by the processors and adapters for storing software program code and data structures associated with the present invention. The processor and adapters may, in turn, comprise processing elements and/or logic circuitry configured to execute the software code and manipulate the data structures. The storage operating system 300, portions of which is typically resident in memory and executed by the processing elements, functionally organizes the node 200 by, inter alia, invoking storage operations in support of the storage service implemented by the node. It will be apparent to those skilled in the art that other processing and memory means, including various computer readable media, may be used for storing and executing program instructions pertaining to the invention described herein.

The network adapter 225 comprises a plurality of ports adapted to couple the node 200 to one or more clients 180 over point-to-point links, wide area networks, virtual private networks implemented over a public network (Internet) or a shared local area network. The network adapter 225 thus may comprise the mechanical, electrical and signaling circuitry needed to connect the node to the network. Illustratively, the computer network 140 may be embodied as an Ethernet network or a Fibre Channel (FC) network. Each client 180 may communicate with the node over network 140 by exchanging discrete frames or packets of data according to pre-defined protocols, such as TCP/IP.

The storage adapter 228 cooperates with the storage operating system 300 executing on the node 200 to access information requested by the clients. The information may be stored on any type of attached array of writable storage device media such as video tape, optical, DVD, magnetic tape, bubble memory, electronic random access memory, microelectro mechanical and any other similar media adapted to store information, including data and parity information. However, as illustratively described herein, the information is preferably stored on the disks 130 of array 120. The storage adapter comprises a plurality of ports having input/output (I/O) interface circuitry that couples to the disks over an I/O interconnect arrangement, such as a conventional high-performance, FC link topology.

Storage of information on each array 120 is preferably implemented as one or more storage "volumes" that comprise a collection of physical storage disks 130 cooperating to define an overall logical arrangement of volume block number (vbn) space on the volume(s). Each logical volume is generally, although not necessarily, associated with its own file system. The disks within a logical volume/file system are typically organized as one or more groups, wherein each group may be operated as a Redundant Array of Independent (or Inexpensive) Disks (RAID). Most RAID implementations, such as a RAID-4 level implementation, enhance the reliability/integrity of data storage through the redundant writing of data "stripes" across a given number of physical disks in the RAID group, and the appropriate storing of parity information with respect to the striped data. An illustrative example of a RAID implementation is a RAID-4 level implementation, although it should be understood that other types and levels of RAID implementations may be used in accordance with the inventive principles described herein.

C. Storage Operating System

To facilitate access to the disks 130, the storage operating system 300 implements a write-anywhere file system that cooperates with one or more virtualization modules to "virtualize" the storage space provided by disks 130. The file system logically organizes the information as a hierarchical structure of named directories and files on the disks. Each "on-disk" file may be implemented as set of disk blocks configured to store information, such as data, whereas the directory may be implemented as a specially formatted file in which names and links to other files and directories are stored. The virtualization module(s) allow the file system to further logically organize information as a hierarchical structure of blocks on the disks that are exported as named logical unit numbers (luns).

In the illustrative embodiment, the storage operating system is preferably the NetApp® Data ONTAP® operating system available from Network Appliance, Inc., Sunnyvale, Calif. that implements a Write Anywhere File Layout (WAFL®) file system. However, it is expressly contemplated that any appropriate storage operating system may be enhanced for use in accordance with the inventive principles described herein. As such, where the term "ONTAP" is employed, it should be taken broadly to refer to any storage operating system that is otherwise adaptable to the teachings of this invention.

Figure 3:
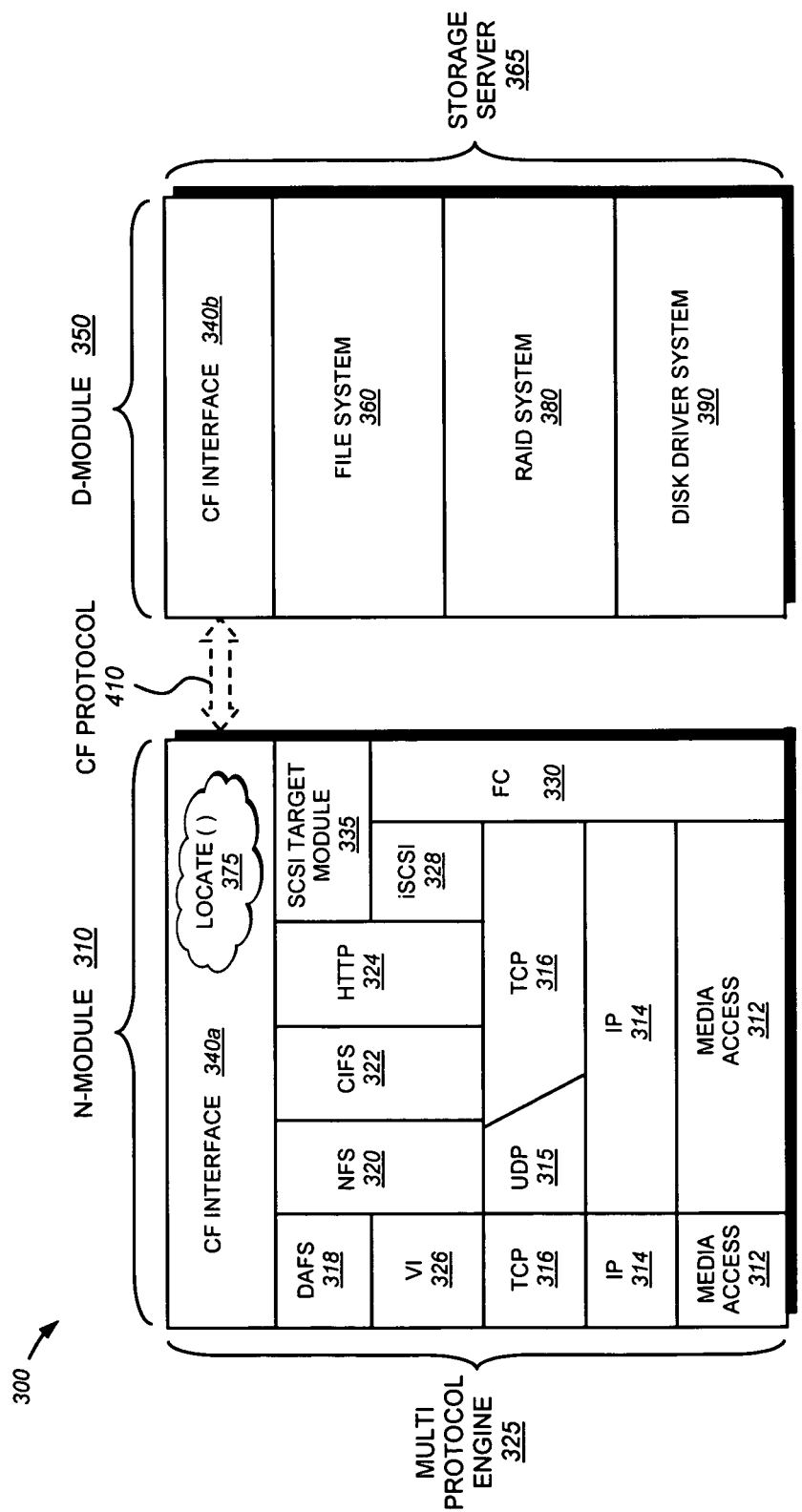
FIG. 3 is a schematic block diagram of a storage operating system that may be advantageously used with the present invention.

FIG. 3 is a schematic block diagram of the storage operating system 300 that may be advantageously used with the present invention. The storage operating system comprises a series of software layers organized to form an integrated network protocol stack or, more generally, a multi-protocol engine 325 that provides data paths for clients to access information stored on the node using block and file access protocols. The multi-protocol engine includes a media access layer 312 of network drivers (e.g., gigabit Ethernet drivers) that interfaces to network protocol layers, such as the IP layer 314 and its supporting transport mechanisms, the TCP layer 316 and the User Datagram Protocol (UDP) layer 315. A file system protocol layer provides multi-protocol file access and, to that end, includes support for the Direct Access File System (DAFS) protocol 318, the NFS protocol 320, the CIFS protocol 322 and the Hypertext Transfer Protocol (HTTP) protocol 324. A VI layer 326 implements the VI architecture to provide direct access transport (DAT) capabilities, such as RDMA, as required by the DAFS protocol 318. An iSCSI driver layer 328 provides block protocol access over the TCP/IP network protocol layers, while a FC driver layer 330 receives and transmits block access requests and responses to and from the node. The FC and iSCSI drivers provide FC-specific and iSCSI-specific access control to the blocks and, thus, manage exports of luns to either iSCSI or FCP or, alternatively, to both iSCSI and FCP when accessing the blocks on the node 200.

In addition, the storage operating system includes a series of software layers organized to form a storage server 365 that provides data paths for accessing information stored on the disks 130 of the node 200. To that end, the storage server 365 includes a file system module 360, a RAID system module 380 and a disk driver system module 390. The RAID system 380 manages the storage and retrieval of information to and from the volumes/disks in accordance with I/O operations, while the disk driver system 390 implements a disk access protocol such as, e.g., the SCSI protocol.

The file system 360 implements a virtualization system of the storage operating system 300 through the interaction with one or more virtualization modules illustratively embodied as, e.g., a virtual disk (vdisk) module (not shown) and a SCSI target module 335. The vdisk module enables access by administrative interfaces, such as a user interface of a management framework 1110 (see FIG. 11), in response to a user (system administrator) issuing commands to the node 200. The SCSI target module 335 is generally disposed between the FC and iSCSI drivers 328, 330 and the file system 360 to provide a translation layer of the virtualization system between the block (lun) space and the file system space, where luns are represented as blocks.

The file system 360 is illustratively a message-based system that provides logical volume management capabilities for use in access to the information stored on the storage devices, such as disks. That is, in addition to providing file system semantics, the file system 360 provides functions normally associated with a volume manager. These functions include (i) aggregation of the disks, (ii) aggregation of storage bandwidth of the disks, and (iii) reliability guarantees, such as mirroring and/or parity (RAID). The file system 360 illustratively implements the WAFL file system (hereinafter generally the "write-anywhere file system") having an on-disk format representation that is block-based using, e.g., 4 kilobyte (KB) blocks and using index nodes ("inodes") to identify files and file attributes (such as creation time, access permissions, size and block location). The file system uses files to store meta-data describing the layout of its file system; these meta-data files include, among others, an inode file. A file handle, i.e., an identifier that includes an inode number, is used to retrieve an inode from disk.

Broadly stated, all inodes of the write-anywhere file system are organized into the inode file. A file system (fs) info block specifies the layout of information in the file system and includes an inode of a file that includes all other inodes of the file system. Each logical volume (file system) has an fsinfo block that is preferably stored at a fixed location within, e.g., a RAID group. The inode of the inode file may directly reference (point to) data blocks of the inode file or may reference indirect blocks of the inode file that, in turn, reference data blocks of the inode file. Within each data block of the inode file are embedded inodes, each of which may reference indirect blocks that, in turn, reference data blocks of a file.

Operationally, a request from the client 180 is forwarded as a packet over the computer network 140 and onto the node 200 where it is received at the network adapter 225. A network driver (of layer 312 or layer 330) processes the packet and, if appropriate, passes it on to a network protocol and file access layer for additional processing prior to forwarding to the write-anywhere file system 360. Here, the file system generates operations to load (retrieve) the requested data from disk 130 if it is not resident "in core", i.e., in memory 224. If the information is not in memory, the file system 360 indexes into the inode file using the inode number to access an appropriate entry and retrieve a logical vbn. The file system then passes a message structure including the logical vbn to the RAID system 380; the logical vbn is mapped to a disk identifier and disk block number (disk,dbn) and sent to an appropriate driver (e.g., SCSI) of the disk driver system 390. The disk driver accesses the dbn from the specified disk 130 and loads the requested data block(s) in memory for processing by the node. Upon completion of the request, the node (and operating system) returns a reply to the client 180 over the network 140.

It should be noted that the software "path" through the storage operating system layers described above needed to perform data storage access for the client request received at the node may alternatively be implemented in hardware. That is, in an alternate embodiment of the invention, a storage access request data path may be implemented as logic circuitry embodied within a field programmable gate array (FPGA) or an application specific integrated circuit (ASIC). This type of hardware implementation increases the performance of the storage service provided by node 200 in response to a request issued by client 180. Moreover, in another alternate embodiment of the invention, the processing elements of adapters 225, 228 may be configured to offload some or all of the packet processing and storage access operations, respectively, from processor 222, to thereby increase the performance of the storage service provided by the node. It is expressly contemplated that the various processes, architectures and procedures described herein can be implemented in hardware, firmware or software.

As used herein, the term "storage operating system" generally refers to the computer-executable code operable on a computer to perform a storage function that manages data access and may, in the case of a node 200, implement data access semantics of a general purpose operating system. The storage operating system can also be implemented as a microkernel, an application program operating over a general-purpose operating system, such as UNIX® or Windows XP®, or as a general-purpose operating system with configurable functionality, which is configured for storage applications as described herein.

In addition, it will be understood to those skilled in the art that the invention described herein may apply to any type of special-purpose (e.g., file server, filer or storage serving appliance) or general-purpose computer, including a standalone computer or portion thereof, embodied as or including a storage system. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems. It should be noted that while this description is written in terms of a write any where file system, the teachings of the present invention may be utilized with any suitable file system, including a write in place file system.

D. CF Protocol

In the illustrative embodiment, the storage server 365 is embodied as D-module 350 of the storage operating system 300 to service one or more volumes of array 120. In addition, the multi-protocol engine 325 is embodied as N-module 310 to (i) perform protocol termination with respect to a client issuing incoming data access request packets over the network 140, as well as (ii) redirect those data access requests to any storage server 365 of the cluster 100. Moreover, the N-module 310 and D-module 350 cooperate to provide a highly-scalable, distributed storage system architecture of the cluster 100. To that end, each module includes a cluster fabric (CF) interface module 340a,b adapted to implement intra-cluster communication among the modules, including D-module-to-D-module communication for data container striping operations described herein.

The protocol layers, e.g., the NFS/CIFS layers and the iSCSI/FC layers, of the N-module 310 function as protocol servers that translate file-based and block based data access requests from clients into CF protocol messages used for communication with the D-module 350. That is, the N-module servers convert the incoming data access requests into file system primitive operations (commands) that are embedded within CF messages by the CF interface module 340 for transmission to the D-modules 350 of the cluster 100.

Notably, the CF interface modules 340 cooperate to provide a single file system image across all D-modules 350 in the cluster 100. Thus, any network port of an N-module that receives a client request can access any data container within the single file system image located on any D-module 350 of the cluster.

Further to the illustrative embodiment, the N-module 310 and D-module 350 are implemented as separately-scheduled processes of storage operating system 300; however, in an alternate embodiment, the modules may be implemented as pieces of code within a single operating system process. Communication between an N-module and D-module is thus illustratively effected through the use of message passing between the modules although, in the case of remote communication between an N-module and D-module of different nodes, such message passing occurs over the cluster switching fabric 150. A known message-passing mechanism provided by the storage operating system to transfer information between modules (processes) is the Inter Process Communication (IPC) mechanism. The protocol used with the IPC mechanism is illustratively a generic file and/or block-based "agnostic" CF protocol that comprises a collection of methods/functions constituting a CF application programming interface (API). Examples of such an agnostic protocol are the SpinFS and SpinNP protocols available from Network Appliance, Inc. The SpinFS protocol is described in the above-referenced U.S. Patent Application Publication No. US 2002/0116593.

The CF interface module 340 implements the CF protocol for communicating file system commands among the modules of cluster 100. Communication is illustratively effected by the D-module exposing the CF API to which an N-module (or another D-module) issues calls. To that end, the CF interface module 340 is organized as a CF encoder and CF decoder. The CF encoder of, e.g., CF interface 340*a* on N-module 310 encapsulates a CF message as (i) a local procedure call (LPC) when communicating a file system command to a D-module 350 residing on the same node 200 or (ii) a remote procedure call (RPC) when communicating the command to a D-module residing on a remote node of the cluster 100. In either case, the CF decoder of CF interface 340*b* on D-module 350 de-encapsulates the CF message and processes the file system command.

Figure 4:
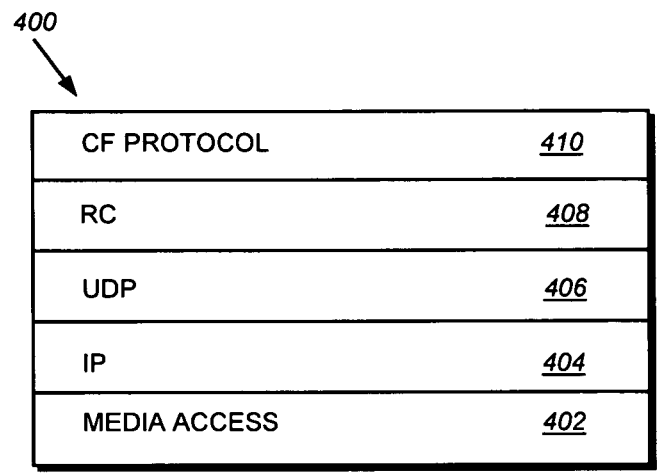
FIG. 4 is a schematic block diagram illustrating the format of a cluster fabric (CF) message in accordance with an embodiment of with the present invention.

FIG. 4 is a schematic block diagram illustrating the format of a CF message 400 in accordance with an embodiment of with the present invention. The CF message 400 is illustratively used for RPC communication over the switching fabric 150 between remote modules of the cluster 100; however, it should be understood that the term "CF message" may be used generally to refer to LPC and RPC communication between modules of the cluster. The CF message 400 includes a media access layer 402, an IP layer 404, a UDP layer 406, a reliable connection (RC) layer 408 and a CF protocol layer 410. As noted, the CF protocol is a generic file system protocol that conveys file system commands related to operations contained within client requests to access data containers stored on the cluster 100; the CF protocol layer 410 is that portion of message 400 that carries the file system commands.

Illustratively, the CF protocol is datagram based and, as such, involves transmission of messages or "envelopes" in a reliable manner from a source (e.g., an N-module 310) to a destination (e.g., a D-module 350). The RC layer 408 implements a reliable transport protocol that is adapted to process such envelopes in accordance with a connectionless protocol, such as UDP 406.

Figure 5:
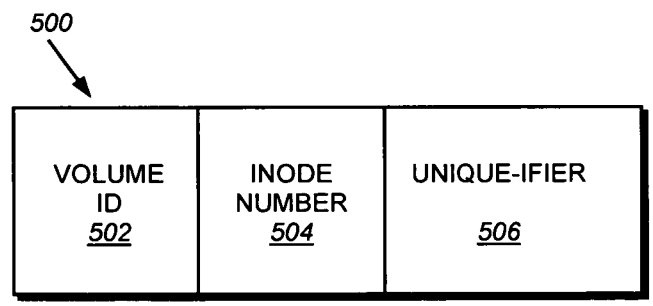
FIG. 5 is a schematic block diagram illustrating the format of a data container handle in accordance with an embodiment of the present invention.

A data container, e.g., a file, is accessed in the file system using a data container handle. FIG. 5 is a schematic block diagram illustrating the format of a data container handle 500 including a volume ID field 502, an inode number field 504 and a unique-ifier field 506. The volume ID field 502 contains a global identifier (within the cluster 100) of the volume within which the data container resides. The inode number field 504 contains an inode number of an inode (within an inode file) pertaining to the data container. The unique-ifier field 506 contains a monotonically increasing number that uniquely identifies the data container handle 500. The unique-ifier is particularly useful in the case where an inode number has been deleted, reused and reassigned to a new data container. The unique-ifier distinguishes that reused inode number in a particular data container from a potentially previous use of those fields.

E. File System Organization

Figure 6:
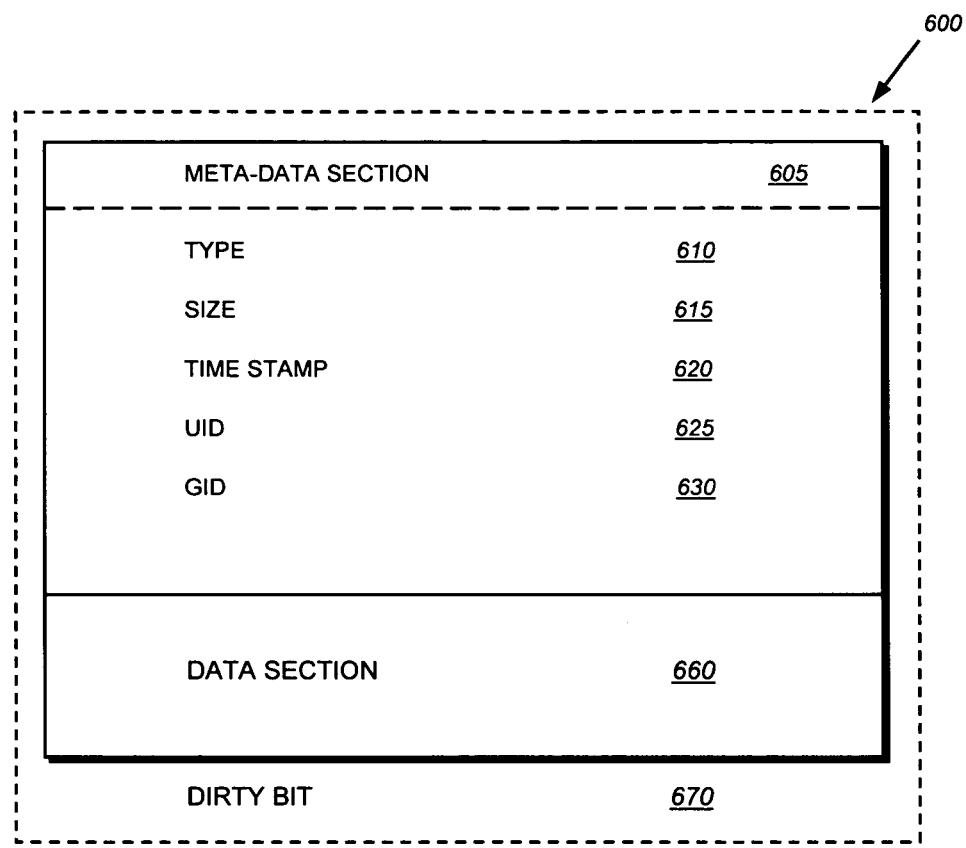
FIG. 6 is a schematic block diagram of an exemplary inode in accordance with an embodiment of the present invention.

In the illustrative embodiment, a data container is represented in the write-anywhere file system as an inode data structure adapted for storage on the disks 130. FIG. 6 is a schematic block diagram of an inode 600, which preferably includes a meta-data section 605 and a data section 660. The information stored in the meta-data section 605 of each inode 600 describes the data container (e.g., a file) and, as such, includes the type (e.g., regular, directory, vdisk) 610 of file, its size 615, time stamps (e.g., access and/or modification time) 620 and ownership, i.e., user identifier (UID 625) and group ID (GID 630), of the file. The contents of the data section 660 of each inode may be interpreted differently depending upon the type of file (inode) defined within the type field 610. For example, the data section 660 of a directory inode contains meta-data controlled by the file system, whereas the data section of a regular inode contains file system data. In this latter case, the data section 660 includes a representation of the data associated with the file.

Specifically, the data section 660 of a regular on-disk inode may include file system data or pointers, the latter referencing 4 KB data blocks on disk used to store the file system data. Each pointer is preferably a logical vbn to facilitate efficiency among the file system and the RAID system 380 when accessing the data on disks. Given the restricted size (e.g., 128 bytes) of the inode, file system data having a size that is less than or equal to 64 bytes is represented, in its entirety, within the data section of that inode. However, if the length of the contents of the data container exceeds 64 bytes but less than or equal to 64 KB, then the data section of the inode (e.g., a first level inode) comprises up to 16 pointers, each of which references a 4 KB block of data on the disk.

Moreover, if the size of the data is greater than 64 KB but less than or equal to 64 megabytes (MB), then each pointer in the data section 660 of the inode (e.g., a second level inode) references an indirect block (e.g., a first level L1 block) that contains 1024 pointers, each of which references a 4 KB data block on disk. For file system data having a size greater than 64 MB, each pointer in the data section 660 of the inode (e.g., a third level L3 inode) references a double-indirect block (e.g., a second level L2 block) that contains 1024 pointers, each referencing an indirect (e.g., a first level L1) block. The indirect block, in turn, contains 1024 pointers, each of which references a 4 KB data block on disk. When accessing a file, each block of the file may be loaded from disk 130 into the memory 224.

When an on-disk inode (or block) is loaded from disk 130 into memory 224, its corresponding in-core structure embeds the on-disk structure. For example, the dotted line surrounding the inode 600 indicates the in-core representation of the on-disk inode structure. The in-core structure is a block of memory that stores the on-disk structure plus additional information needed to manage data in the memory (but not on disk). The additional information may include, e.g., a "dirty" bit 670. After data in the inode (or block) is updated/modified as instructed by, e.g., a write operation, the modified data is marked "dirty" using the dirty bit 670 so that the inode (block) can be subsequently "flushed" (stored) to disk. The in-core and on-disk format structures of the WAFL file system, including the inodes and inode file, are disclosed and described in the previously incorporated U.S. Pat. No. 5,819, 292 titled METHOD FOR MAINTAINING CONSISTENT STATES OF A FILE SYSTEM AND FOR CREATING USER-ACCESSIBLE READ-ONLY COPIES OF A FILE SYSTEM by David Hitz et al., issued on Oct. 6, 1998.

Figure 7:
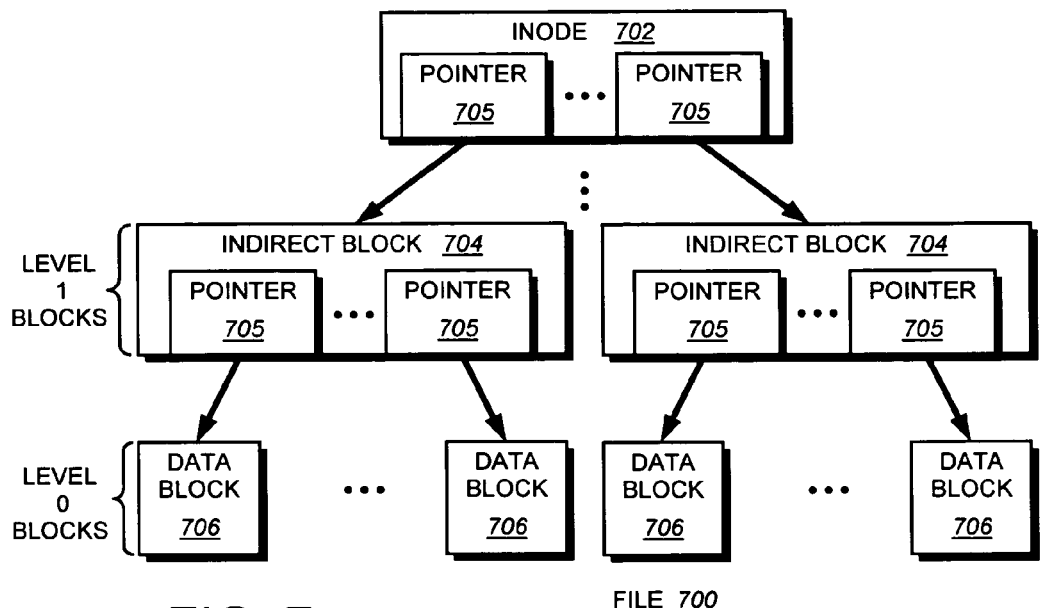
FIG. 7 is a schematic block diagram of an exemplary buffer tree in accordance with an embodiment of the present invention.

FIG. 7 is a schematic block diagram of an embodiment of a buffer tree of a file that may be advantageously used with the present invention. The buffer tree is an internal representation of blocks for a file (e.g., file 700) loaded into the memory 224 and maintained by the write-anywhere file system 360. A root (top-level) inode 702, such as an embedded inode, references indirect (e.g., level 1) blocks 704. Note that there may be additional levels of indirect blocks (e.g., level 2, level 3) depending upon the size of the file. The indirect blocks (and inode) contain pointers 705 that ultimately reference data blocks 706 used to store the actual data of the file. That is, the data of file 700 are contained in data blocks and the locations of these blocks are stored in the indirect blocks of the file. Each level 1 indirect block 704 may contain pointers to as many as 1024 data blocks. According to the "write anywhere" nature of the file system, these blocks may be located anywhere on the disks 130.

A file system layout is provided that apportions an underlying physical volume into one or more virtual volumes (or flexible volume) of a storage system, such as node 200. An example of such a file system layout is described in U.S. patent application Ser. No. 10/836,817 titled EXTENSION OF WRITE ANYWHERE FILE SYSTEM LAYOUT, by John K. Edwards et al. and assigned to Network Appliance, Inc. The underlying physical volume is an aggregate comprising one or more groups of disks, such as RAID groups, of the node. The aggregate has its own physical volume block number (pvbn) space and maintains meta-data, such as block allocation structures, within that pvbn space. Each flexible volume has its own virtual volume block number (vvbn) space and maintains meta-data, such as block allocation structures, within that vvbn space. Each flexible volume is a file system that is associated with a container file; the container file is a file in the aggregate that contains all blocks used by the flexible volume. Moreover, each flexible volume comprises data blocks and indirect blocks that contain block pointers that point at either other indirect blocks or data blocks.

In one embodiment, pvbns are used as block pointers within buffer trees of files (such as file 700) stored in a flexible volume. This "hybrid" flexible volume embodiment involves the insertion of only the pvbn in the parent indirect block (e.g., inode or indirect block). On a read path of a logical volume, a "logical" volume (vol) info block has one or more pointers that reference one or more fsinfo blocks, each of which, in turn, points to an inode file and its corresponding inode buffer tree. The read path on a flexible volume is generally the same, following pvbns (instead of vvbns) to find appropriate locations of blocks; in this context, the read path (and corresponding read performance) of a flexible volume is substantially similar to that of a physical volume. Translation from pvbn-to-disk,dbn occurs at the file system/RAID system boundary of the storage operating system 300.

Figure 8:
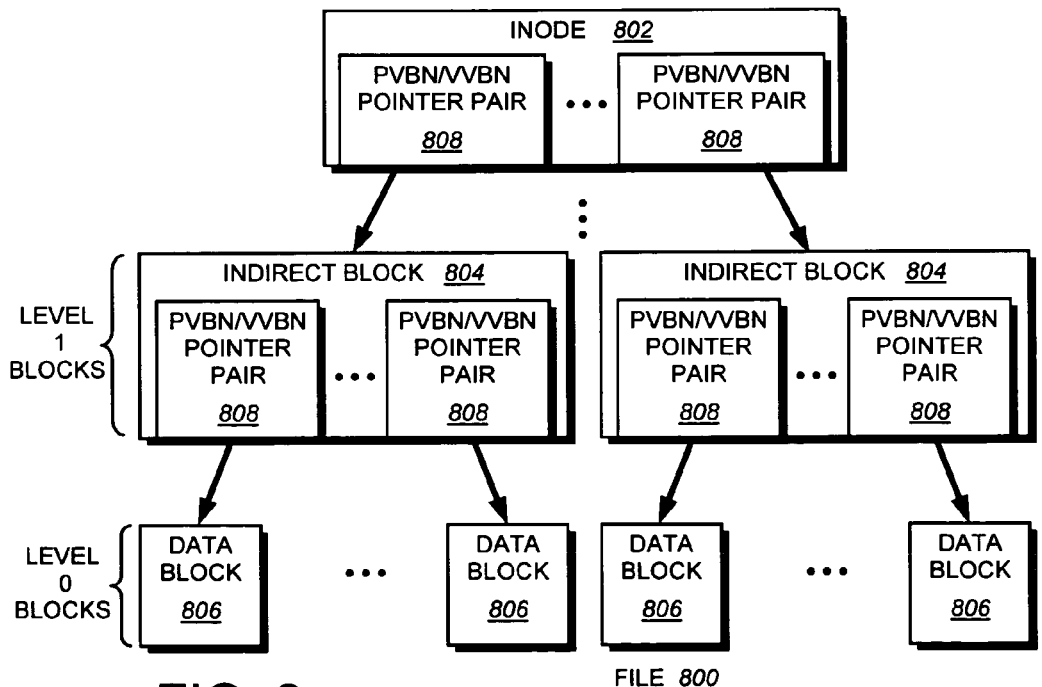
FIG. 8 is a schematic block diagram of an illustrative embodiment of a buffer tree of a file that may be advantageously used with the present invention.

In an illustrative dual vbn hybrid flexible volume embodiment, both a pvbn and its corresponding vvbn are inserted in the parent indirect blocks in the buffer tree of a file. That is, the pvbn and vvbn are stored as a pair for each block pointer in most buffer tree structures that have pointers to other blocks, e.g., level 1 (L1) indirect blocks, inode file level 0 (L0) blocks. FIG. 8 is a schematic block diagram of an illustrative embodiment of a buffer tree of a file 800 that may be advantageously used with the present invention. A root (top-level) inode 802, such as an embedded inode, references indirect (e.g., level 1) blocks 804. Note that there may be additional levels of indirect blocks (e.g., level 2, level 3) depending upon the size of the file. The indirect blocks (and inode) contain pvbn/vvbn pointer pair structures 808 that ultimately reference data blocks 806 used to store the actual data of the file.

The pvbns reference locations on disks of the aggregate, whereas the vvbns reference locations within files of the flexible volume. The use of pvbns as block pointers 808 in the indirect blocks 804 provides efficiencies in the read paths, while the use of vvbn block pointers provides efficient access to required meta-data. That is, when freeing a block of a file, the parent indirect block in the file contains readily available vvbn block pointers, which avoids the latency associated with accessing an owner map to perform pvbn-to-vvbn translations; yet, on the read path, the pvbn is available.

Figure 9:
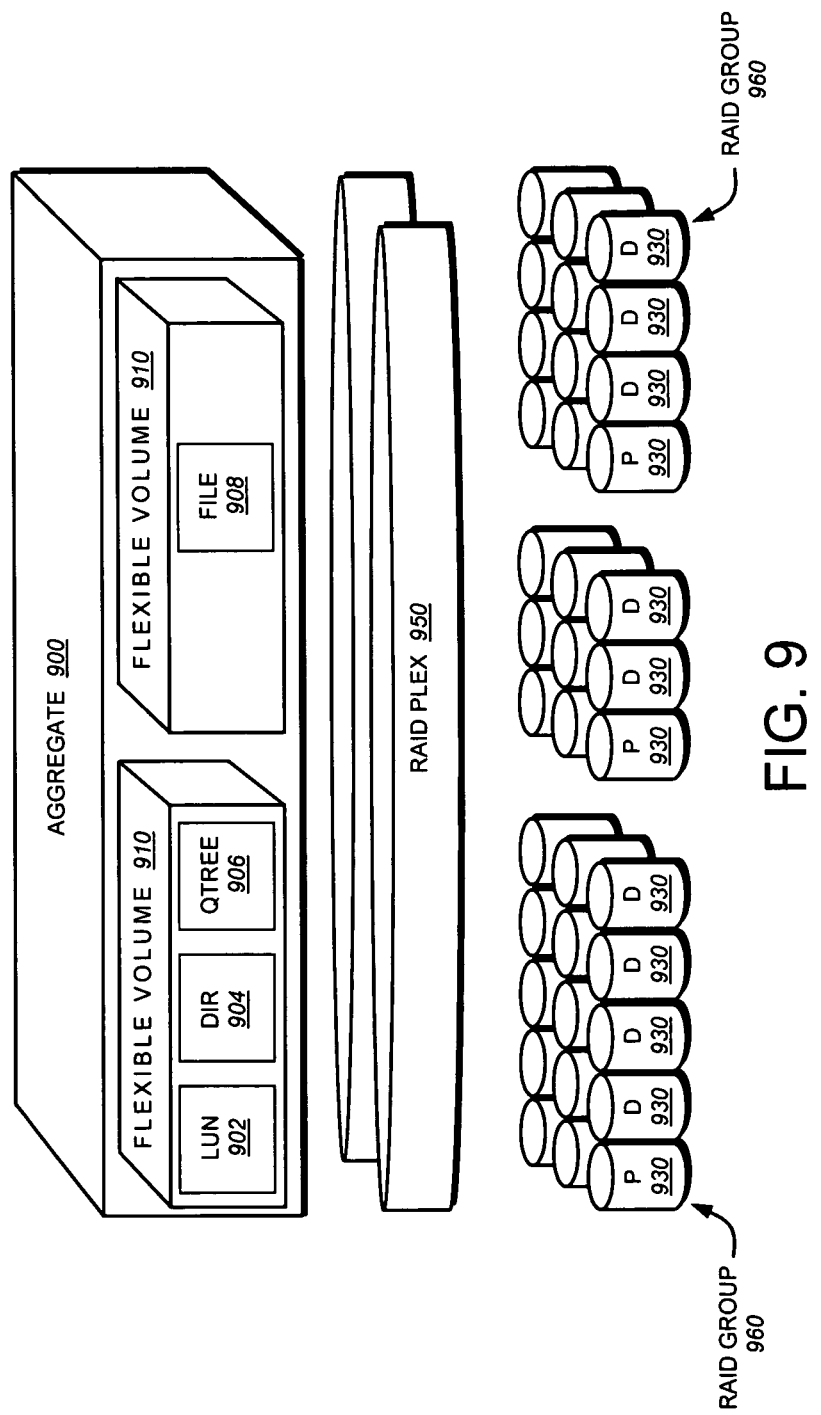
FIG. 9 is a schematic block diagram of an exemplary aggregate in accordance with an embodiment of the present invention.

FIG. 9 is a schematic block diagram of an embodiment of an aggregate 900 that may be advantageously used with the present invention. Luns (blocks) 902, directories 904, qtrees 906 and files 908 may be contained within flexible volumes 910, such as dual vbn flexible volumes, that, in turn, are contained within the aggregate 900. The aggregate 900 is illustratively layered on top of the RAID system, which is represented by at least one RAID plex 950 (depending upon whether the storage configuration is mirrored), wherein each plex 950 comprises at least one RAID group 960. Each RAID group further comprises a plurality of disks 930, e.g., one or more data (D) disks and at least one (P) parity disk.

Whereas the aggregate 900 is analogous to a physical volume of a conventional storage system, a flexible volume is analogous to a file within that physical volume. That is, the aggregate 900 may include one or more files, wherein each file contains a flexible volume 910 and wherein the sum of the storage space consumed by the flexible volumes is physically smaller than (or equal to) the size of the overall physical volume. The aggregate utilizes a physical pvbn space that defines a storage space of blocks provided by the disks of the physical volume, while each embedded flexible volume (within a file) utilizes a logical vvbn space to organize those blocks, e.g., as files. Each vvbn space is an independent set of numbers that corresponds to locations within the file, which locations are then translated to dbns on disks. Since the flexible volume 910 is also a logical volume, it has its own block allocation structures (e.g., active, space and summary maps) in its vvbn space.

A container file is a file in the aggregate that contains all blocks used by a flexible volume. The container file is an internal (to the aggregate) feature that supports a flexible volume; illustratively, there is one container file per flexible volume. Similar to a pure logical volume in a file approach, the container file is a hidden file (not accessible to a user) in the aggregate that holds every block in use by the flexible volume. The aggregate includes an illustrative hidden meta-data root directory that contains subdirectories of flexible volumes:

WAFL/fsid/filesystem file, storage label file

Specifically, a physical file system (WAFL) directory includes a subdirectory for each flexible volume in the aggregate, with the name of subdirectory being a file system identifier (fsid) of the flexible volume. Each fsid subdirectory (flexible volume) contains at least two files, a filesystem file and a storage label file. The storage label file is illustratively a 4 KB file that contains meta-data similar to that stored in a conventional raid label. In other words, the storage label file is the analog of a raid label and, as such, contains information about the state of the flexible volume such as, e.g., the name of the flexible volume, a universal unique identifier (uuid) and fsid of the flexible volume, whether it is online, being created or being destroyed, etc.

Figure 10:
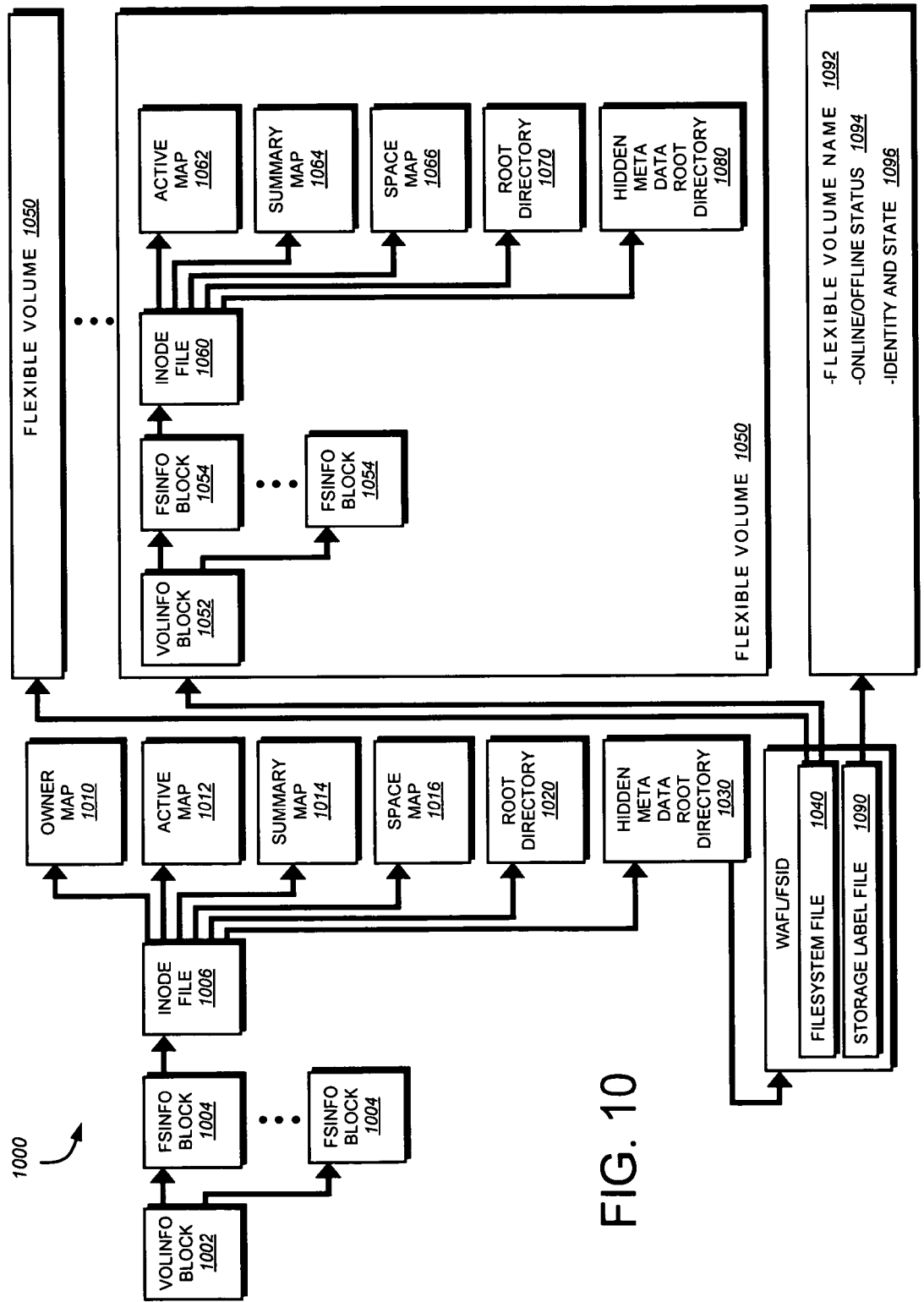
FIG. 10 is a schematic block diagram of an exemplary on-disk layout of the aggregate in accordance with an embodiment of the present invention.

FIG. 10 is a schematic block diagram of an on-disk representation of an aggregate 1000. The storage operating system 300, e.g., the RAID system 380, assembles a physical volume of pvbns to create the aggregate 1000, with pvbns 1 and 2 comprising a "physical" volinfo block 1002 for the aggregate. The volinfo block 1002 contains block pointers to fsinfo blocks 1004, each of which may represent a snapshot of the aggregate. Each fsinfo block 1004 includes a block pointer to an inode file 1006 that contains inodes of a plurality of files, including an owner map 1010, an active map 1012, a summary map 1014 and a space map 1016, as well as other special meta-data files. The inode file 1006 further includes a root directory 1020 and a "hidden" meta-data root directory 1030, the latter of which includes a namespace having files related to a flexible volume in which users cannot "see" the files. The hidden meta-data root directory includes the WAFL/fsid/directory structure that contains filesystem file 1040 and storage label file 1090. Note that root directory 1020 in the aggregate is empty; all files related to the aggregate are organized within the hidden meta-data root directory 1030.

In addition to being embodied as a container file having level 1 blocks organized as a container map, the filesystem file 1040 includes block pointers that reference various file systems embodied as flexible volumes 1050. The aggregate 1000 maintains these flexible volumes 1050 at special reserved inode numbers. Each flexible volume 1050 also has special reserved inode numbers within its flexible volume space that are used for, among other things, the block allocation bitmap structures. As noted, the block allocation bitmap structures, e.g., active map 1062, summary map 1064 and space map 1066, are located in each flexible volume.

Specifically, each flexible volume 1050 has the same inode file structure/content as the aggregate, with the exception that there is no owner map and no WAFL/fsid/filesystem file, storage label file directory structure in a hidden meta-data root directory 1080. To that end, each flexible volume 1050 has a volinfo block 1052 that points to one or more fsinfo blocks 1054, each of which may represent a snapshot, along with the active file system of the flexible volume. Each fsinfo block, in turn, points to an inode file 1060 that, as noted, has the same inode structure/content as the aggregate with the exceptions noted above. Each flexible volume 1050 has its own inode file 1060 and distinct inode space with corresponding inode numbers, as well as its own root (fsid) directory 1070 and subdirectories of files that can be exported separately from other flexible volumes.

The storage label file 1090 contained within the hidden meta-data root directory 1030 of the aggregate is a small file that functions as an analog to a conventional raid label. A raid label includes physical information about the storage system, such as the volume name; that information is loaded into the storage label file 1090. Illustratively, the storage label file 1090 includes the name 1092 of the associated flexible volume 1050, the online/offline status 1094 of the flexible volume, and other identity and state information 1096 of the associated flexible volume (whether it is in the process of being created or destroyed).

F. VLDB

Figure 11:
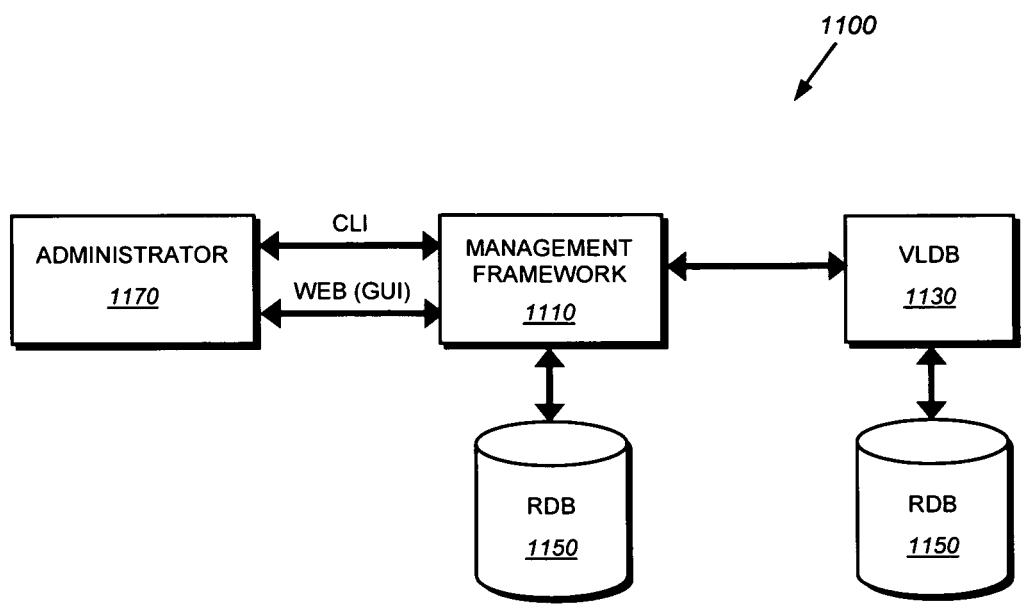
FIG. 11 is a schematic block diagram illustrating a collection of management processes in accordance with an embodiment of the present invention.

FIG. 11 is a schematic block diagram illustrating a collection of management processes that execute as user mode applications 1100 on the storage operating system 300 to provide management of configuration information (i.e. management data) for the nodes of the cluster. To that end, the management processes include a management framework process 1110 and a volume location database (VLDB) process 1130, each utilizing a data replication service (RDB 1150) linked as a library. The management framework 1110 provides a user to an administrator 1170 interface via a command line interface (CLI) and/or a web-based graphical user interface (GUI). The management framework is illustratively based on a conventional common interface model (CIM) object manager that provides the entity to which users/system administrators interact with a node 200 in order to manage the cluster 100.

The VLDB 1130 is a database process that tracks the locations of various storage components (e.g., flexible volumes, aggregates, etc.) within the cluster 100 to thereby facilitate routing of requests throughout the cluster. In the illustrative embodiment, the N-module 310 of each node accesses a configuration table 235 that maps the volume ID 502 of a data container handle 500 to a D-module 350 that "owns" (services) the data container within the cluster. The VLDB includes a plurality of entries which, in turn, provide the contents of entries in the configuration table 235; among other things, these VLDB entries keep track of the locations of the flexible volumes (hereinafter generally "volumes 910") and aggregates 900 within the cluster.

The VLDB illustratively implements a RPC interface, e.g., a Sun RPC interface, which allows the N-module 310 to query the VLDB 1130. When encountering contents of a data container handle 500 that are not stored in its configuration table, the N-module sends an RPC to the VLDB process. In response, the VLDB 1130 returns to the N-module the appropriate mapping information, including an ID of the D-module that owns the data container. The N-module caches the information in its configuration table 235 and uses the D-module ID to forward the incoming request to the appropriate data container. All functions and interactions between the N-module 310 and D-module 350 are coordinated on a cluster-wide basis through the collection of management processes and the RDB library user mode applications 1100.

To that end, the management processes have interfaces to (are closely coupled to) RDB 1150. The RDB comprises a library that provides a persistent object store (storing of objects) for the management data processed by the management processes. Notably, the RDB 1150 replicates and synchronizes the management data object store access across all nodes 200 of the cluster 100 to thereby ensure that the RDB database image is identical on all of the nodes 200. At system startup, each node 200 records the status/state of its interfaces and IP addresses (those IP addresses it "owns") into the RDB database.

G. Synthetic Multi-Protocol Client

The present invention provides a system and method for generating a synthetic multi-protocol network client for testing one or more storage systems. The synthetic multi-protocol client illustratively supports the TCP and/or UDP protocols along with a plurality of higher-level network access protocols such as, e.g., the NFS protocol (and its associated protocols, e.g., NLM, portmap, and mount) and the CIFS protocol. When used as a testing tool, a user first initiates the client with appropriate connection information to permit the synthetic multi-protocol client to connect simultaneously to the storage system using one or more of the supported protocols. The connection information illustratively includes (a) the network address(es) of the storage system, (b) the types of protocols to be utilized in the connection, (c) NFS specific parameters (e.g., username, NIS server, mount path, etc.), (d) CIFS specific parameters (e.g., CIFS domain name, username, share name, etc.) and (e) optional base paths relative to the root of the NFS mount/CIFS share name root if the default test location is to differ from the root. Thereafter, a connection (i.e., a secure logical circuit) is established between the synthetic multi-protocol client and a corresponding program (process) on the storage system.

Once connected, the user may select one or more tests to execute to ensure proper multi-protocol implementation within the storage system. Each test may be predefined and/or customizable by the users and may further interleave one or more data access operations using each of the plurality of protocols to test proper interactions within the storage system and/or storage operating system executing on the storage system. The synthetic multi-protocol client examines the received responses from the server and compares them with a set of expected results. Any deviation from the expected results is immediately reported to the user of the client as a server error with additional error context information as needed. In alternate embodiments, the synthetic multi-protocol client may be utilized within a testing suite and software initiated by other software processes. Additionally, the synthetic multi-protocol client may be utilized as an auto generated capacity planning tool for regular use for benchmarking and testing in-field deployments of storage systems.

Figure 12:
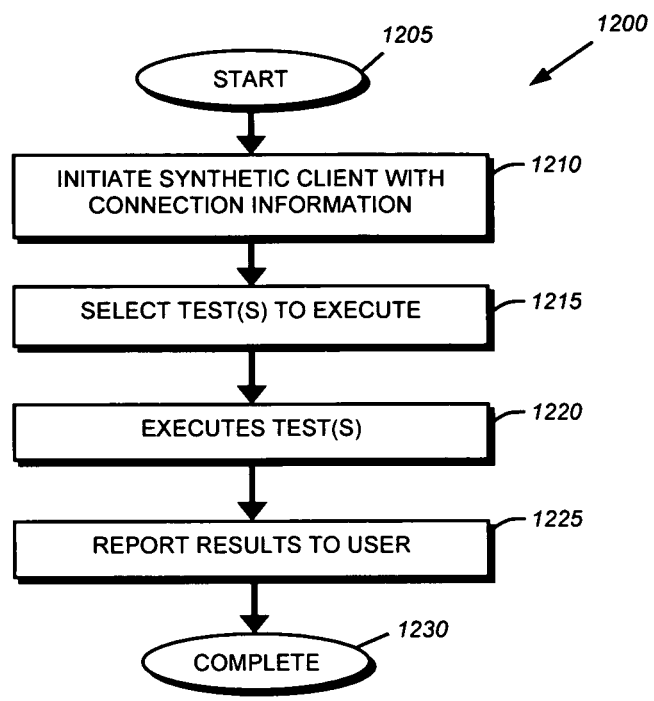
FIG. 12 is a flowchart detailing the steps of a procedure for utilizing a synthetic multi-protocol client in testing a storage system in accordance with an embodiment of the present invention.

As noted above, the synthetic multi-protocol client 190 enables simultaneous connections to a storage system using one or more protocols. Once connected, the synthetic multi-protocol client 190 may interleave requests from each of the protocols, e.g., sending a CIFS operation, then a NFS operation and then another CIFS operation, to thereby test interactions within various components of the storage system and the storage operating system. FIG. 12 is a flowchart detailing the steps of a procedure 1200 for testing a storage system using a synthetic multi-protocol client 190 in accordance with an embodiment of the present invention. The procedure 1200 begins in step 1205 and continues to step 1210 where a user initiates the synthetic multi-protocol client 190 with the connection information required to connect to the storage system. Illustratively, the connection information may be stored within a configuration file read by the synthetic multi-protocol client 190 or may be provided using command line options to a CLI command utilized to initiate the synthetic multi-protocol client 190. In an alternate embodiment, a GUI may be associated with the synthetic multi-protocol client 190 to enable the user to enter the appropriate connection information. Illustratively, the connection information identifies the appropriate network addresses, ports, protocol types, etc. that the synthetic multi-protocol client 190 should utilize in connecting to the storage system.

Once the synthetic multi-protocol client 190 has been initiated, the user then selects one or more tests to execute in step 1215. Illustratively, the synthetic multi-protocol client 190 may be preconfigured with a plurality of predefined tests, such as that described below in reference to FIG. 13, to verify certain well-known implementation issues among the various protocols. Alternately, the synthetic multi-protocol client 190 may permit the user to specify a customizable set of commands to be sent to the storage system using any of the supported protocols. For example, the user may identify any of the commands available from the supported protocols to be utilized along with the ordering that they should be sent to the storage system. Once the user has specified the test(s) to execute, the synthetic multi-protocol client 190 executes the identified tests in step 1220.

One exemplary test is described below in reference to FIG. 13. These tests are executed by sending appropriate series of commands to the storage system over the connections previously opened and are typically implemented by interleaving commands among the various protocols supported by the storage system. Depending on the test, certain commands will succeed and others will fail in accordance with the storage operating system implementation of the storage system. The synthetic multi-protocol client 190 retains the success/failure information and compares the observed results with the results that should occur based on a correct implementation of the protocols. For example, certain commands should fail if certain other previously sent commands have been executed. The synthetic multi-protocol client reports these results to the user in step 1225 by, for example, displaying the results on the CLI and/or the GUI. The procedure 1200 then completes in step 1230.

Figure 13:
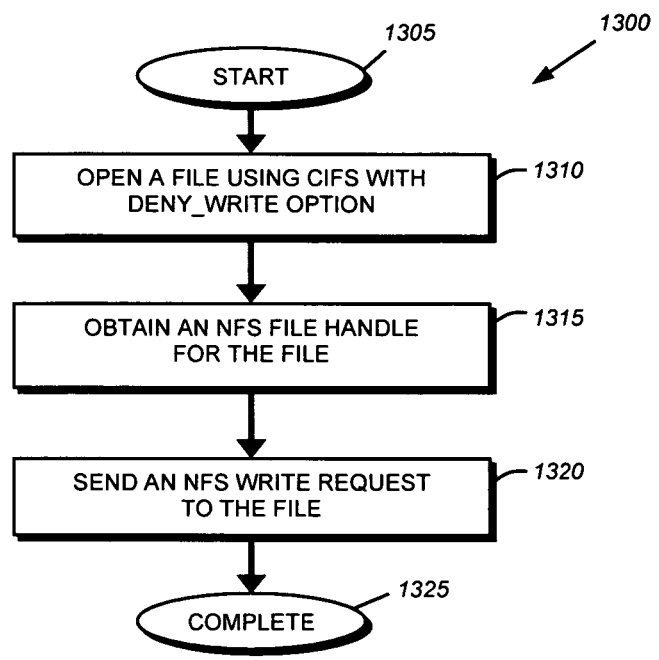
FIG. 13 is a flowchart detailing the steps of an exemplary test procedure executed by the synthetic multi-protocol client in accordance with an embodiment of the present invention.

FIG. 13 is a flowchart detailing the steps of a procedure 1300 of an exemplary test that may be preconfigured within the synthetic multi-protocol client 190 in accordance with an embodiment of the present invention. The procedure 1300 begins in step 1305 and continues to step 1310 where the synthetic multi-protocol client 190 opens a file using the CIFS protocol with the DENY_WRITE option set. By setting the DENY_WRITE option, the CIFS server within the storage operating system should mark the file as inaccessible for write-based operations by all other users except the initiator of the original DENY_WRITE request. It is common for multi-protocol server vendors to have a mode of operation, which may illustratively be a default, where the DENY_WRITE lock applies across all access protocols. Once the file level DENY_WRITE lock has been applied via CIFS access, the synthetic multi-protocol client 190 obtains an NFS file handle for the same file in step 1315 before sending an NFS write request directed to the file in step 1320. The procedure then completes in step 1325. If the NFS/CIFS interactions operate properly within the storage system, the NFS write request set in step 1320 should fail due to the previously sent DENY_WRITE option. However, should there be an error within the storage system's implementation, the NFS write request may succeed. The success/failure of each test provides valuable information to a storage system vendor in testing its implementation.

The foregoing description has been directed to particular embodiments of this invention. It will be apparent, however, that other variations and modifications may be made to the described embodiments, with the attainment of some or all of their advantages. It should be noted that while the present invention has been written in terms of the NFS and CIFS protocols, the principles of the present invention may be utilized with any set of protocols. As such, the description of the CIFS and NFS should be taken as exemplary only. Furthermore, while this description has been written in terms of N and D-modules, the teachings of the present invention are equally suitable to systems where the functionality of the N and D-modules are implemented in a single system. Alternately, the functions of the N and D-modules may be distributed among any number of separate systems, wherein each system performs one or more of the functions. Additionally, the procedures, processes and/or modules described herein may be implemented in hardware, software, embodied as a computer-readable medium having program instructions, firmware, or a combination thereof. Therefore, it is the object of the appended claims to cover all such variations and modifications as come within the true spirit and scope of the invention.

What is claimed is:

1. A method for testing a multi-protocol storage system, the method comprising:
identifying a set of connection information to be utilized by a synthetic multi-protocol client program of a client device when the synthetic multiprotocol client program connects to the multi-protocol storage system, the synthetic multi-protocol client program simultaneously connecting to the multi-protocol storage system utilizing a plurality of differing access protocols used to access data stored on the multi-protocol storage system, the synthetic multi-protocol client program simulating a plurality of clients sending interleaved commands associated with the plurality of differing access protocols to the multi-protocol storage system;
selecting a test to be executed by the synthetic multi-protocol client program to determine whether the interleaved commands simulating the plurality of clients and associated with the plurality of differing access protocols produce proper multi-protocol implementation within the multi-protocol storage system;
executing, by a processor, the selected tests at the multi-protocol synthetic client program by interleaving the commands that include issuing and executing at least two commands, associated with two differing access protocols from the plurality of differing access protocols, to a data container to obtain a received result;
determining the proper multi-protocol implementation within the multi-protocol storage system and displaying results associated with the proper multi-protocol implementation when the received result received from executing the at least two commands associated with the two differing access protocols matches an expected result that is expected to occur with correct implementation of the executed at least two commands associated with the two differing access protocols, where the expected result is in accordance with the proper multi-protocol implementation; and
determining improper multi-protocol implementation within the multi-protocol storage system and displaying an error message on the client device when the received result received from executing the at least two commands associated with the two differing access protocols does not match the expected result that is in accordance with the proper multi-protocol implementation.

2. The method of claim 1 wherein the connection information comprises one or more network addresses associated with the multi-protocol storage system.

3. The method of claim 1 wherein the connection information comprises an identity of one or more network protocols for use in connecting to the multi-protocol storage system.

4. The method of claim 1 wherein the tests to be executed is predefined.

5. The method of claim 1 wherein the tests is user-defined.

6. The method of claim 1 wherein one of the plurality of differing access protocols comprises a network file system protocol.

7. The method of claim 1 wherein one of the plurality of differing access protocols comprises a common internet file system protocol.

8. A system configured to test a multi-protocol storage system, the system comprising:
the multi-protocol storage system operatively interconnected with a computer, a processor of the computer executing a synthetic multi-protocol client program with connection information; and
the synthetic multi-protocol client program configured to:
connect to the multi-protocol storage system and simulate a plurality of clients sending interleaved commands associated with a plurality of differing access protocols used to access data stored on the multi-protocol storage system execute a tests at the multi-protocol storage system by interleaving the commands simulating the plurality of clients and associated with the plurality of differing access protocols to a data container of the multi-protocol storage system, wherein the execution of the test includes executing a first command associated with a first access protocol and then executing a second command associated with a second access protocol at the data container to obtain a received result,
determine proper multi-protocol implementation within the multi-protocol storage system and displaying results associated with the proper multi-protocol implementation when the received result received from execution of the first command and the second command associated with differing access protocols matches an expected result that is expected to occur if the first command associated with the first access protocol and then the second command associated with the second access protocol are properly executed at the data container, where the expected result is in accordance with the proper multi-protocol implementation within the multi-protocol storage system, and
determine that the multi-protocol storage system is not implemented properly and displaying an error message that the multi-protocol storage system is not implemented correctly when the received results does not match the expected result.

9. The system of claim 8 wherein the connection information includes network addresses for the multi-protocol storage system and specific parameters for the plurality of protocols.

10. The system of claim 8 wherein the executed commands from the plurality of differing access protocols comprise a predefined test routine.

11. A system configured to test a multi-protocol storage system having a processor and a memory, the system comprising:
means for identifying a set of connection information to be utilized in enabling a plurality of simultaneous connections to the multi-protocol storage system utilizing a plurality of differing access protocols used to access data stored on the multi-protocol storage system, where the connections simulate a plurality of clients sending interleaved commands associated with the plurality of differing access protocols to the multi-protocol storage system;
means for selecting a tests to be executed to determine whether the interleaved commands simulating the plurality of clients associated with the plurality of differing access protocols produce proper multi-protocol implementation within the multi-protocol storage system; and means for executing the selected test by interleaving the commands simulating the plurality of clients and associated with the plurality of differing access protocols at a data container of the multi-protocol storage system, the means for executing the selected test including:
  means for executing a first command associated with a first access protocol at the data container, and
  means for executing a second command associated with a second access protocol at data container to obtain a received result;
means for determining that the multi-protocol storage system is implemented properly and displaying results associated with determining that the multi-protocol storage system is implemented properly, in response to the received result received from execution of the first command and the second command associated with differing access protocols matching an expected result that is expected to occur if the first command and the second command are properly executed at the data container; and
means for displaying an error message that the multi-protocol storage system is not implemented properly, in response to the received result not matching the expected result.

12. The system of claim 11 wherein the connection information comprises one or more network addresses associated with the multi-protocol storage system.

13. The system of claim 11 wherein the connection information comprises an identity of one or more network protocols for use in connecting to the multi-protocol storage system.

14. The system of claim 11 wherein the tests to be executed is predefined.

15. The system of claim 11 wherein the one or more tests is user-defined.

16. The system of claim 11 wherein one of the plurality of differing access protocols comprises a network file system protocol.

17. The system of claim 11 wherein one of the plurality of differing access protocols comprises a common internet file system protocol.

18. A non-transitory computer readable storage medium containing executable program instructions executed by a processor, comprising:
  program instructions that identify a set of connection information to be utilized by a synthetic multi-protocol client program of a client device when connecting to a multi-protocol storage system, the synthetic multi-protocol client program to enable a plurality of simultaneous connections to the multi-protocol storage system utilizing a plurality of differing access protocols utilized to access data stored at the multi-protocol storage system, the synthetic multi-protocol client program simulating a plurality of clients sending interleaved commands associated with the plurality of differing access protocols to the multi-protocol storage system;
  program instructions that select a tests to be executed by the synthetic multi-protocol client program to determine whether the commands simulating the plurality of clients and associated with the plurality of differing access protocols produce proper multi-protocol implementation within the multi-protocol storage system; and
  program instructions that execute the selected test at the multi-protocol synthetic client program by interleaving the commands simulating the plurality of clients and associated with the plurality of differing access protocols, the program instructions that execute the selected test, including:
    program instructions that execute a first command associated with a first access protocol at a data container stored at the multi-protocol storage system,
    program instructions that execute a second command associated with a second access protocol at the data container stored at the multi-protocol storage system to obtain a received result,
    program instructions that determine that the multi-protocol storage system is implemented properly and displaying results associated with determining that the multi-protocol storage system is implemented properly, in response to the received result received from execution of the first command and the second command associated with differing access protocols matching an expected result that is expected to occur if the first command and the second command are properly executed at the data container, and
    program instructions that display an error message that the multi-protocol storage system is not implemented properly, in response to the received result not matching the expected result.

19. The method of claim 1 wherein differences between the received results and the expected result are reported to the client device.

20. The method of claim 1 wherein the connection information further includes network addresses for the storage system, ports, and specific parameters for the plurality of differing access protocols.

21. The method of claim 1 wherein a user initiates the synthetic multi-protocol client program.

22. The method of claim 1 wherein the first command is a command from the Common Internet File System protocol and the second command is a command from the common the Network File System protocol.

23. A method comprising:
  initiating a synthetic multi-protocol client program to connect to a multi-protocol storage system, having a processor and a memory, by utilizing connection information that identifies at least network addresses associated with the multi-protocol storage system and a plurality of differing access protocols used to access data stored on the multi-protocol storage system, the synthetic multi-protocol client program simulating a plurality of clients sending interleaved commands associated with the plurality of differing access protocols to the multi-protocol storage system;
  selecting a test to be executed by the synthetic multi-protocol client program to determine whether the commands simulating the plurality of clients and associated with the plurality of differing access protocols produce proper multi-protocol implementation within the multi-protocol storage system;
  executing the selected test at the multi-protocol synthetic client program by interleaving the commands simulating the plurality of clients and associated with the plurality of differing access protocols, including:
    issuing a first command, associated with a first access protocol of the plurality of differing access protocols, directed to the data container stored on the multi-protocol storage system;
    executing, at the multi-protocol storage system, the first command associated with the first access protocol;
    issuing a second command, associated with a second access protocol of the plurality of differing access protocols, directed to the data container stored on the multi-protocol storage system;

executing, at the multi-protocol storage system, the second command associated with the second access protocol to obtain a received result;

in response to the received result received from execution of the interleaved first command and the second command associated with differing access protocols matching an expected result that is expected to occur if the first command associated with the first access protocol and then the second command associated with the second access protocol are properly executed at the data container, where the expected result is in accordance with the proper multi-protocol implementation within the multi-protocol storage system, determining that the multi-protocol storage system is implemented properly and displaying, utilizing the synthetic multi-protocol client program, results associated with determining that the multi-protocol storage system is implemented properly; and in response to the received result received from execution of the first command and the second command associated with differing access protocols not matching the expected result that is expected to occur if the first command associated with the first access protocol and then the second command associated with the second access protocol are implemented correctly to the data container, determining that the multi-protocol storage system is not implemented properly and displaying an error message utilizing the synthetic multi-protocol client program that the multi-protocol storage system is not implemented properly.

24. The method of claim 23 wherein the first command is from the Common Internet File System protocol and the second command of the executed interleaved commands is from the Network File System protocol.

* * * * *